(12) United States Patent
Jevans et al.

(10) Patent No.: US 8,381,294 B2
(45) Date of Patent: *Feb. 19, 2013

(54) STORAGE DEVICE WITH WEBSITE TRUST INDICATION

(75) Inventors: David Alexander Jevans, Los Altos, CA (US); Steve Ryan, Virginia Beach, VA (US); Gil Spencer, Los Altos, CA (US); Shannon Holland, Los Altos, CA (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,151

(22) Filed: Aug. 17, 2011

(65) Prior Publication Data

US 2012/0054862 A1    Mar. 1, 2012

Related U.S. Application Data

(63) Continuation of application No. 11/634,763, filed on Dec. 5, 2006, now Pat. No. 8,015,606, which is a continuation-in-part of application No. 11/486,799, filed on Jul. 14, 2006.

(60) Provisional application No. 60/741,732, filed on Dec. 5, 2005, provisional application No. 60/698,899, filed on Jul. 14, 2005.

(51) Int. Cl.
*H04L 29/14* (2006.01)

(52) U.S. Cl. ............... 726/22; 726/23; 726/26

(58) Field of Classification Search ............... None
See application file for complete search history.

(56) References Cited

U.S. PATENT DOCUMENTS

| | | | |
|---|---|---|---|
| 4,578,530 A | 3/1986 | Zeidler | |
| 5,010,571 A | 4/1991 | Katznelson | |
| 5,341,339 A | 8/1994 | Wells | |
| 5,404,485 A | 4/1995 | Ban | |
| 5,479,638 A | 12/1995 | Assar et al. | |
| 5,857,021 A | 1/1999 | Kataoka et al. | |
| 5,937,425 A | 8/1999 | Ban | |
| 6,032,227 A | 2/2000 | Shaheen et al. | |
| 6,092,196 A | 7/2000 | Reiche | |
| 6,118,874 A | 9/2000 | Okamoto et al. | |
| 6,223,284 B1 | 4/2001 | Novoa | |
| 6,292,899 B1 | 9/2001 | McBride | |
| 6,731,536 B1 | 5/2004 | McClain | |
| 6,763,468 B2 | 7/2004 | Gupta et al. | |
| 6,776,332 B2 | 8/2004 | Allen et al. | |
| 6,791,877 B2 | 9/2004 | Miura et al. | |
| 6,834,795 B1 | 12/2004 | Rasmussen et al. | |
| 6,920,527 B2 | 7/2005 | Cloutier et al. | |
| 6,961,852 B2 | 11/2005 | Craft | |
| 6,987,927 B1 | 1/2006 | Battaglia et al. | |
| 6,993,661 B1 | 1/2006 | Garfinkel | |
| 7,266,699 B2 | 9/2007 | Newman et al. | |
| 7,272,723 B1 | 9/2007 | Abbott et al. | |
| 7,275,139 B1 | 9/2007 | Tormasov et al. | |
| 7,278,025 B2 | 10/2007 | Saito et al. | |

(Continued)

FOREIGN PATENT DOCUMENTS

WO    WO 02/47081 A2    6/2002

OTHER PUBLICATIONS

Jevans, David, U.S. Appl. No. 11/644,089, entitled "Detachable Storage Device with RAM Cache", filed Dec. 21, 2006.

(Continued)

*Primary Examiner* — Minh Dinh
(74) *Attorney, Agent, or Firm* — Kenneth E. Levitt; Dorsey & Whitney LLP (57) ABSTRACT

A portable storage device can comprise a web page confidence module and a device controller. The web page confidence module may be configured to receive a web page address and determine a trust level status associated with the web page address. The device controller may be configured to indicate a trust level status based on the trust level determination.

20 Claims, 8 Drawing Sheets

U.S. PATENT DOCUMENTS

| | | | |
|---|---|---|---|
| 7,360,091 B2 | 4/2008 | Aikawa et al. |
| 7,412,420 B2 | 8/2008 | Holdsworth |
| 7,475,425 B2 | 1/2009 | Bantz et al. |
| 7,478,248 B2 | 1/2009 | Ziv et al. |
| 7,631,191 B2 | 12/2009 | Glazer et al. |
| 7,685,425 B1 | 3/2010 | Wright et al. |
| 7,698,442 B1 | 4/2010 | Krishnamurthy et al. |
| 7,757,088 B2 | 7/2010 | Abdulhayoglu |
| 8,015,606 B1 | 9/2011 | Jevans et al. |
| 2001/0045451 A1 | 11/2001 | Tan et al. |
| 2002/0029215 A1 | 3/2002 | Whitmyer, Jr. |
| 2002/0046342 A1 | 4/2002 | Elteto et al. |
| 2003/0005336 A1 | 1/2003 | Poo et al. |
| 2003/0041253 A1 | 2/2003 | Matsui et al. |
| 2003/0149670 A1 | 8/2003 | Cronce |
| 2003/0149854 A1 | 8/2003 | Yoshino et al. |
| 2003/0182584 A1 | 9/2003 | Banes |
| 2003/0204735 A1 | 10/2003 | Schnitzmeier |
| 2003/0204754 A1 | 10/2003 | Cromer et al. |
| 2003/0215090 A1 | 11/2003 | Saito et al. |
| 2004/0059925 A1 | 3/2004 | Benhammou et al. |
| 2004/0073797 A1 | 4/2004 | Fascenda |
| 2004/0103288 A1 | 5/2004 | Ziv et al. |
| 2004/0103325 A1 | 5/2004 | Priebatsch |
| 2004/0123113 A1 | 6/2004 | Mathiassen et al. |
| 2004/0146015 A1 | 7/2004 | Cross et al. |
| 2004/0148333 A1 | 7/2004 | Manion et al. |
| 2004/0177258 A1 | 9/2004 | Ong |
| 2004/0188710 A1 | 9/2004 | Koren et al. |
| 2005/0015540 A1 | 1/2005 | Tsai et al. |
| 2005/0020315 A1 | 1/2005 | Robertson |
| 2005/0044377 A1 | 2/2005 | Huang |
| 2005/0055519 A1 | 3/2005 | Stuart et al. |
| 2005/0182973 A1 | 8/2005 | Funahashi et al. |
| 2006/0016875 A1 | 1/2006 | Bonalle et al. |
| 2006/0021059 A1 | 1/2006 | Brown et al. |
| 2006/0041932 A1 | 2/2006 | Cromer et al. |
| 2006/0047717 A1 | 3/2006 | Pereira |
| 2006/0069840 A1 | 3/2006 | Corbett et al. |
| 2006/0095688 A1 | 5/2006 | Kawamura et al. |
| 2006/0117393 A1 | 6/2006 | Merry et al. |
| 2006/0129830 A1 | 6/2006 | Haller et al. |
| 2006/0143476 A1 | 6/2006 | McGovern |
| 2006/0179309 A1 | 8/2006 | Cross et al. |
| 2006/0208066 A1 | 9/2006 | Finn et al. |
| 2006/0224742 A1 | 10/2006 | Shahbazi |
| 2006/0236363 A1 | 10/2006 | Heard et al. |
| 2007/0016743 A1 | 1/2007 | Jevans |
| 2007/0016756 A1 | 1/2007 | Hsieh et al. |
| 2007/0028033 A1 | 2/2007 | Hsieh et al. |
| 2007/0033330 A1 | 2/2007 | Sinclair et al. |
| 2007/0038802 A1 | 2/2007 | Tsai et al. |
| 2007/0056043 A1 | 3/2007 | Onyon et al. |
| 2007/0067620 A1 | 3/2007 | Jevans |
| 2007/0101434 A1 | 5/2007 | Jevans |
| 2007/0118898 A1 | 5/2007 | Morgan et al. |
| 2007/0143530 A1 | 6/2007 | Rudelic et al. |
| 2007/0143532 A1 | 6/2007 | Gorobets et al. |
| 2007/0180509 A1 | 8/2007 | Swartz et al. |
| 2007/0250919 A1 | 10/2007 | Shull et al. |
| 2007/0266421 A1 | 11/2007 | Vaidya et al. |
| 2007/0300031 A1 | 12/2007 | Jevans et al. |
| 2007/0300052 A1 | 12/2007 | Jevans |
| 2008/0005561 A1 | 1/2008 | Brown et al. |
| 2009/0222117 A1 | 9/2009 | Kaplan et al. |

OTHER PUBLICATIONS

Jevans, David, U.S. Appl. No. 11/644,051, entitled "Storage Device with Accessible Partitions", filed Dec. 21, 2006.

Sedaghat, et al., "A Dynamic Web Agent for Verifying the Security and Integrity of a Web Site's Contents", IEEE, Aug. 2002.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random Number Generator Embedded in Reconfigurable Hardware." Springer-Verlag. Lecture Notes in Computer Science. vol. 2523, pp. 415-430. 2003.

Denning, Dorothy E. et al. "A Taxonomy for Key Escrow Encryption Systems," *Communications of the ACM*, vol. 39, No. 3, pp. 34-40 (Mar. 1996).

Tal, Arie. "Two Technologies Compared: NOR v. NAND", White Paper, 01-SR-012-04-8L, Rev. 1.1, Jul. 2003, pp. 1-14.

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

STORAGE DEVICE WITH WEBSITE TRUST INDICATION

CROSS-REFERENCE TO RELATED APPLICATIONS

The present application claims the priority benefit of U.S. provisional patent Ser. No. 60/741,732, filed Dec. 5, 2005, entitled "Security Device with Trusted Site Indicators" which is incorporated by reference herein.

The present application is a continuation application and claims the priority benefit of U.S. patent application Ser. No. 11/634,763, filed on Dec. 5, 2006, entitled "Storage Device with Website Trust Indication" and issued Sep. 6, 2011, as U.S. Pat. No. 8,015,606, which is a continuation in part of U.S. application Ser. No. 11/486,799, filed Jul. 14, 2006, entitled "Secure Storage Device with Offline Code Entry", which claims benefit to U.S. provisional patent Ser. No. 60/698,899, filed Jul. 14, 2005, entitled "Secure Storage Device with Offline Password Entry," all of which are incorporated by reference herein.

STATEMENT OF GOVERNMENT INTEREST

This invention was made with government support under Grant No. FA 8750-05-C-0251, awarded by the United States Air Force Research Laboratory. The government has certain rights in the invention.

BACKGROUND

1. Field of the Invention

The present invention relates generally to data storage, and more particularly to data storage devices.

2. Background Art

As data processing becomes ubiquitous, users are increasingly demanding that data be both mobile and secure. Although networks, such as the Internet, can transmit data from one computer to another, users often must identify and transmit the data they need to the proper destination. Unfortunately, the data may fail to be transmitted due to firewalls, proxies, spam blockers, size limitations, technical error, or human error. Further, it is not always practical for users to guess what data is needed at a future time and the location of the need. The data is also often routed through unsecure servers or network devices which can intercept the data and further compromise security.

As a result of these problems, users often load data on USB memory devices (e.g., a memory stick) and carry data with them. Unfortunately, USB memory devices can be stolen and accessed by thieves. Some USB memory devices have passwords which must be entered on the host computer before accessing the stored data. However, the password can be cracked (e.g., a brute force attack) and the data accessed.

Some USB memory devices lock the stored data after a predetermined number of password attempts have been made to prevent data theft. Unfortunately, the lock is often easy to reset. Further, the attacker can make a copy of the data stored in the USB memory device, enter the predetermined number of password attempts, delete the data, recopy the data, and enter new password attempts. This process can be repeated until successful thereby inevitably accessing the data.

Current USB memory devices do not have active security or security programs that help to protect the user's data or computer resources. In one example, current USB memory devices do not assist the user to identify web sites that are not secure or help update information to help make browsing safer.

SUMMARY OF THE INVENTION

An exemplary system to indicate website trustworthiness may include a portable storage device comprising a web page confidence module and a device controller. The web page confidence module may be configured to receive a web page address and determine a trust level status associated with the web page address. The device controller may be configured to indicate a trust level status based on the trust level determination.

The portable storage device may be a USB storage device. The web page confidence module can be configured to determine a trust level status by determining if the web page address is associated with a white list, determining if the web page address is associated with a third-party confidence database, and/or by determining if a web page certificate associated with the web page address is valid.

The web page confidence module may be further configured to receive a user trust level setting. In various embodiments, the web page confidence module is configured to determine a trust level status by determining if a web page associated with the web page address comprises a certificate, determine if the certificate is expired, and determine the trust level status based, at least in part, on the user trust level setting.

The device controller may indicate a trust level status by emitting a sound, displaying an image, or illuminating a light emitting diode (LED) on the portable storage device.

An exemplary method for indicating trustworthiness of a website with a portable storage device may comprise receiving a web page address, determining a trust level status of the web page address, and indicating a trust level status on the portable storage device based on the trust level determination.

Exemplary computer readable medium may have embodied thereon executable code, the code being executable by a processor to perform a method for indicating trustworthiness of a website with a portable storage device, the method comprising receiving a web page address, determining a trust level status of the web page address, and indicating a trust level status on the portable storage device based on the trust level determination.

DETAILED DESCRIPTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A secure storage device, such as portable memory device, can require the user to input a user code offline to unlock the stored data within the secure storage device. A user code is manually input the secure storage device and comprises a password, code, or a user identifier. The user code can be a unique set of characters that may contain a variety of characters (alphanumeric, numeric, symbols, or special characters). In other embodiments, the user code can comprise a user identifier such as a fingerprint, voice identifier, or retina scan. Entering the user code offline comprises the user entering the user code into the secure storage device before the secure storage device is operationally coupled with a digital device. To be operationally coupled, the secure storage device is coupled with a digital device and is enabled to receive commands and/or data from the digital device. A digital device is any device with a processor capable of sending or receiving data (e.g., a computer, laptop, personal digital assistant, and cell phone).

In one example, the user enters the user code into the secure storage device to authorize access to the stored data. The user can subsequently plug the secure storage device into the digital device. The digital device can then proceed to mount an unlocked data partition and access the stored data. If the user does not enter the user code or enters an incorrect user code and proceeds to plug the secure storage device into the digital device, the digital device may not be able to access the stored data.

By entering the user code directly into the secure storage device rather than through a digital device, neither the stored data nor the device driver may be accessed. In some embodiments, the digital device does not recognize the secure storage device and the media within the secure storage device cannot be mounted until the correct user code is entered. Consequently, the stored data cannot be copied from the secure storage device without a user code. As a result, the stored data cannot be copied from the secure storage device onto another media to attack the user code or apply new software attacks to retrieve the stored data. The danger of theft of the secure storage device is reduced as the thief may not be able to access the stored data.

A portable storage device is any storage device (e.g., hard drive, flash device, USB storage device) that is designed to be operatively coupled with the digital device. A portable storage device may comprise a secure storage device.

In various embodiments, the portable storage device may indicate a trust level status of a web page. The portable storage device may receive a web page address that the user of the digital device wishes to visit. The portable storage device may determine the trust level status of the web page associated with the web page address. The trust level status may be indicated on the portable storage device.

Figure 1:
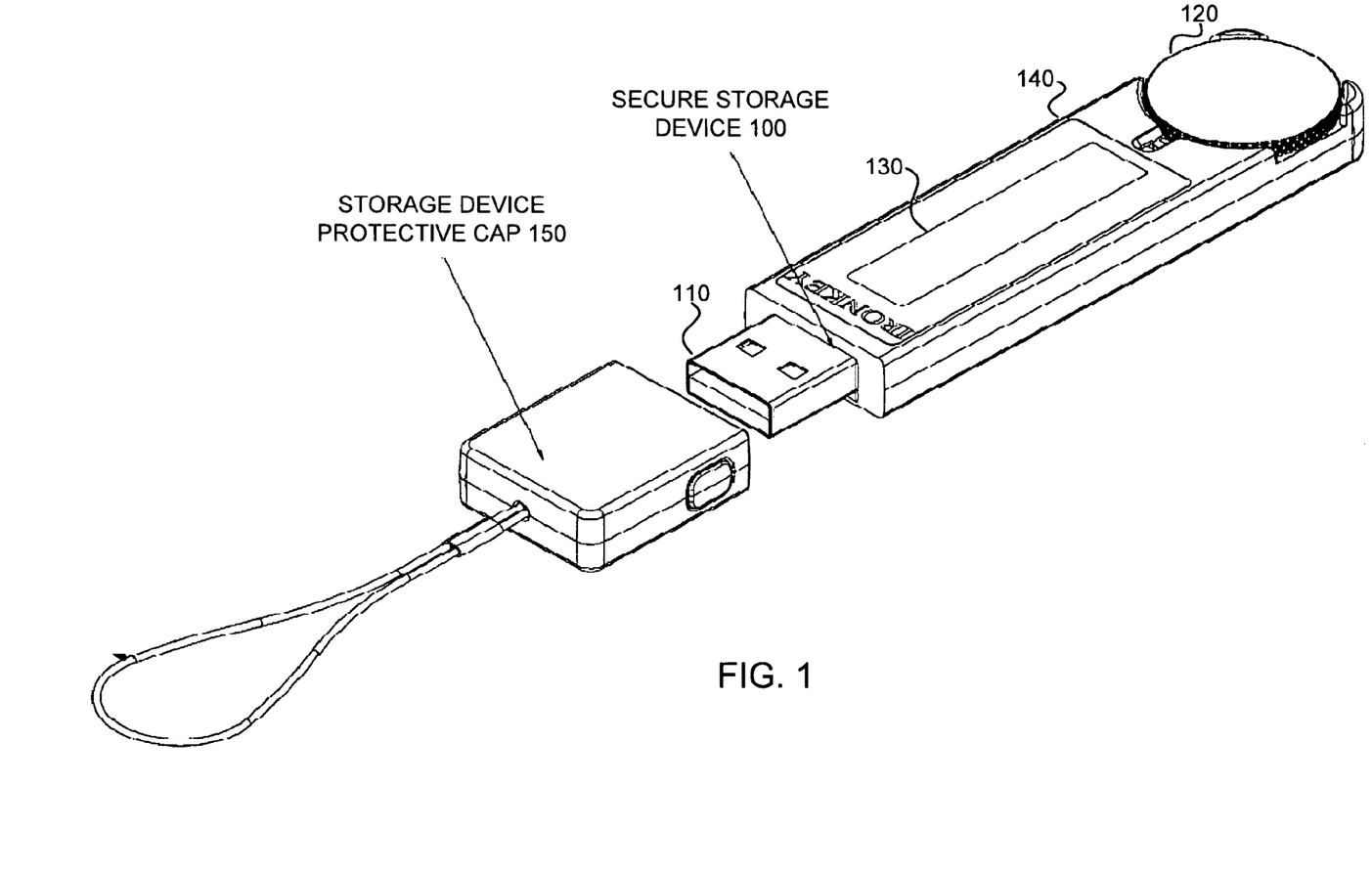
FIG. 1 depicts a secure storage device, in accordance with one embodiment of the present invention.

Referring to FIG. 1, a secure storage device 100 in accordance with one embodiment of the present invention is shown. The secure storage device 100 comprises a USB connector 110 coupled to a secure storage device housing 140. A user can turn a user input dial 120 to enter the user code into the secure storage device 100. In various embodiments, a display 130 (discussed further herein) may display characters or text to the user. The display 130 may display information to the user indicating that the user code is correct or incorrect.

In some embodiments, the display 130 and/or an authorization indicator (not depicted) indicates when the user code has been accepted and access to the stored data on the secure storage device 100 has been authorized. The authorization indicator may be a light emitting diode (LED), a speaker, or any other device that can indicate that access to the stored data has been authorized.

In one example, a user carries stored data within the secure storage device 100. Prior to plugging the secure storage device 100 into a digital device's USB port, the user enters the user code into the secure storage device 100 by turning the user input dial 120 to enter the user code. After the correct user code has been entered, the display 130 can illuminate or otherwise indicate that access to the stored data has been authorized. The user may then proceed to plug the secure storage device 100 into the digital device to access the stored data.

If the user fails to enter the correct user code but plugs the secure storage device 100 into the digital device, the digital device may fail to recognize the secure storage device 100, fail to mount the digital media within the secure storage device 100, fail to execute the device driver for the secure storage device 100, and/or be unable to access the stored data.

The user may operate the user input dial 120 to input the user code and/or operate a menu displayed on the display 130. In some embodiments, the user may operate the user input dial 120 in a manner similar to a blackberry jog dial.

The display 130 is any screen that may display information. In some embodiments, the display 130 is a LCD display. The display 130 may display information indicating that access to the stored data is authorized, that the device is locked, that the user name is incorrect, or that a password is incorrect.

In various embodiments, the display 130 can display information that a web page is trustworthy, untrustworthy, or in question. In some examples, if a web page is determined to be untrustworthy, the display 130 can flash a red color, display text indicating that the web page is untrustworthy, display an image, or any combination of color, text, and/or images. If a web page is determined to be trustworthy, the display 130 can flash a green color, display text indicating that the web page is trustworthy or secure, display an image, or any combination of color, text, and/or images. Similarly, if the trustworthiness of the web page is unknown or unable to be determined, the display 130 may flash an orange color, display text, display an image, or any combination.

The display 130 may also display information if a web page has a secured connection (e.g., https, SSL, VPN, TSL). In one example, the display 130 may display an image of a key if a secure web page or encrypted channel is successfully accessed.

The USB connector 110 can be coupled to any USB port of the digital device. Although a USB connector 110 is depicted in FIG. 1, the secure storage device 100 is not limited to a USB type connector. In some embodiments, the secure storage device 100 can be coupled to the digital device through a firewire port, Ethernet connector, serial port, parallel port, SCSI port, or ATA connector. Further, the secure storage device 100 can operationally couple wirelessly to the digital device over 802.11 a/b/g/n standards, Bluetooth, or wireless USB. It is apparent to those skilled in the art that the secure storage device 100 can be operationally coupled to the digital device in many ways.

In various embodiments, the secure storage device 100 can be physically or wirelessly coupled to the digital device but the connection is not operational until the user code is entered into the secure storage device 100. In one example, the secure storage device 100 comprises the USB connector 110 coupled to the digital device. Until the user code is entered into the secure storage device 100, the digital device may not recognize the secure storage device 100, load the device driver for the secure storage device 100, or mount the media contained within the secure storage device 100.

The storage device housing 140 may contain any type of data storage medium or storage system as well as a power source. The data storage medium (not depicted) may comprise flash memory (e.g., NAND flash or NOR flash memory), a hard drive, ram disk, or any other kind of data storage. A storage system (further described in FIG. 6) can comprise the data storage medium. The power source (not depicted) can be a rechargeable battery, a replaceable battery (e.g., AA), or a capacitor. In some embodiments, the battery or capacitor can be recharged by the digital device through the USB connector 110 (or any connector that couples the secure storage device 100 to the digital device).

Similarly, although the user code input is facilitated by the radial dial input 120 in FIG. 1, it is apparent to those skilled in the art that the user code can be input into the secure storage device 100 in many ways. In one example, the secure storage device 100 comprises a keypad with which the user can press keys to enter the user code. In another example, the secure storage device 100 comprises a biometric sensor which can receive the voice, fingerprint, or retina scan of the user as the user code. The secure storage device 100 can also comprise a radial knob input, a user input dial, and a code indicator which may be used by a user to input the user code.

The optional authorization indicator displays an indicator when the user code has been accepted and that access to the stored data is authorized. The authorization indicator can comprise a light emitting diode (LED) that emits a light to indicate that the user code has been accepted. In some embodiments, the authorization indicator can generate a light of a first color to indicate user code acceptance (e.g., green) and a second color to indicate that the user code has been rejected (e.g., red). The authorization indicator may comprise multiple LEDs to indicate user code acceptance, rejection, or lockout of the secure storage device 100 (further discussed in FIG. 5).

Similarly, the authorization indicator may illuminate different LEDs based on the trustworthiness of a web page. If a web page is trusted, the authorization indicator may illuminate a green LED. If the web page is not trusted or is untrustworthy then the authorization indicator may illuminate a red LED. If the trustworthiness of the web page is uncertain or unable to be determined, the authorization indicator may illuminate an orange or yellow LED.

An authorization lockout may be triggered if one or more incorrect user codes are received. An authorization lockout locks the secure storage device 100 so that the secure storage device 100 will refuse to accept any user codes until reset. In other embodiments, a sound may be generated by the secure storage device 100 to indicate that the user code has been accepted or rejected.

In some embodiments, the secure storage device 100 comprises a speaker (not depicted). The speaker may emit a sound (e.g., a "beep") based on the trust level status of a web page. In one example, the speaker emits a single sound if the web page is trustworthy, two sounds if the trustworthiness of the web page is uncertain, and three sounds if the web page is untrustworthy.

A storage device protective cap 150 may be coupled to the secure storage device 100. The storage device protective cap 150 may protect the USB connector 110. In some embodiments, the storage device protective cap 150 may lock to the secure storage device 100. The storage device protective cap 150 may be automatically unlocked when the user enters the correct user name or password into the secure storage device 100.

Figure 2:
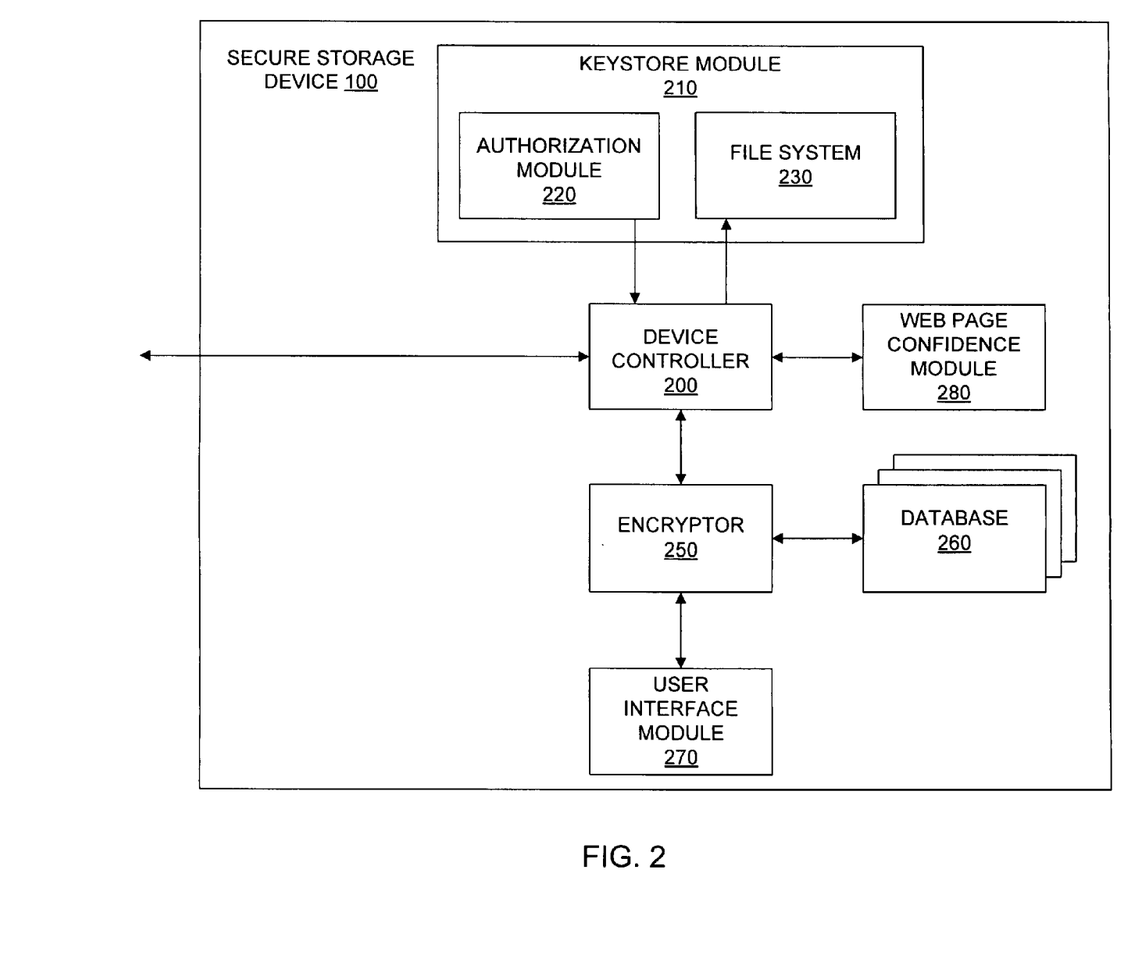
FIG. 2 depicts a block diagram of a secure storage device, in accordance with one embodiment of the present invention.

FIG. 2 is a block diagram of a secure storage device 100, in accordance with one embodiment of the present invention. The secure storage device 100 comprises a device controller 200 coupled to the keystore module 210. The keystore module 210 comprises an authorization module 220 and a file system 230. The device controller 200 is further coupled to an encryptor 250 which is further coupled to database 260, a user interface module 270, and a web page confidence module 280.

The device controller 200 can comprise the device driver for the secure storage device 100. The device controller 200 controls the communication with the digital device (not depicted) as well as the operations within the secure storage device 100. In some embodiments, the device controller 200 can control a processor or circuitry within the secure storage device 100.

In various embodiments, the device controller 200 receives an identification query from a digital device requesting the type of device of the secure storage device 100. If authorized, the device controller 200 can respond by transmitting a signal to the digital device identifying the secure storage device 100 and allowing any digital media to be mounted within the operating system of the digital device. If not authorized, the device controller 200 may refuse to respond or reject the digital device's attempts to mount the digital media.

In other embodiments, the device controller 200 receives the identification query from the digital device and identifies the secure storage device 100 as a compact disc (CD). The digital device may then attempt to automatically run an authorization check program from the device controller 200. This feature is similar to automatically playing the first song on an audio CD upon loading of the CD. The authorization check program can determine if access to the stored data is authorized. If access to stored data is not authorized, the authorization check program may terminate or the transmission of data between the digital device and the secure storage device 100 may terminate. Further, the device controller 200 may refuse to allow the digital device access to the database 260 and/or refuse to allow the digital media to be mounted.

The device controller 200 may also control the authorization indicator (FIG. 1) based on an authorization indicator signal from the authorization module 220. In one example, if access to the stored data is authorized, the device controller 200 may send a signal to the authorization indicator to illuminate an LED or generate a sound to indicate that access to the stored data is authorized. The device controller 200 can also generate a signal to the authorization indicator to illuminate an LED or generate a sound to indicate that authorization is denied or that the secure storage device 100 is locked.

The keystore module 210 authorizes access to the stored data within the database 260. The keystore module 210 comprises the authorization module 220 and optionally a file system 230. In some embodiments, the keystore module 210 also comprises one or more authentication passwords to authorize access to the stored data. In other embodiments, the one or more authentication passwords are within the file system 230. An authentication password is a password, code, or key retained the secure storage device 100 to authenticate the user code.

The authorization module 220 receives the user code or a security code (discussed herein) and determines if the user is authorized to access the stored data. In exemplary embodiments, the authorization module 220 determines if the user is authorized to access the stored data based on the user code (or the security code) and the one or more authentication passwords. In one example, the authorization module decrypts an authentication password with user code (or security code). If the decrypted authentication password is correct, then the user may be authorized to access the stored data. If the user is authorized to access the stored data, the authorization module 220 may transmit an authorization signal to the device controller 200 to authorize access. If the user is not authorized, the authorization module 220 may refuse to respond to subsequent attempts to access the data (e.g., locking the secured storage device 100).

In some embodiments, the secure storage device 100 does not comprise authentication passwords. As a result, the authorization module 220 can base the authorization determination on the user code. Those skilled in the art will appreciate that there may be many methods in which the authorization module 220 determine authorization to access the stored data based, at least in part, on the user code or security code.

The file system 230 can maintain a list of one or more authentication passwords and/or the file system of the database 260. In various embodiments, the file system 230 can associate each authentication password with a different partition within the digital media. As a result, separate user codes may access different partitions within the digital media. In one example, a first user code entered by a user may authorize access to a partition with data used at the user's home. A second user code may authorize access to a partition with business data. As a result, a single secure storage device 100 may be shared with co-workers or others which may be allowed to access some, but not all, of the stored data retained within the secure storage device 100. In other embodiments, the file system 230 can maintain a list of one or more user codes associated with the different partitions within the digital media.

Further, in some embodiments, the file system 230 maintains the scrambled database file system of the database 260. The database file system is a map of the stored data retained within the database 260. Without the database file system, the digital device may not be able to identify stored data contained within the database 260. By separating the database file system from the database 260, a thief who removes the database 260 from the secure storage device 100 may fail to steal the database file system. Further, the database file system may be scrambled. The authorization module 220 can unscramble the database file system within the file system 230 or the database 260 when access to the stored data is authorized.

The encryptor 250 functions to encrypt or decrypt security codes, stored data within the database 260, or the file system 230. In exemplary embodiments, the stored data within the database 260 is encrypted. If access to stored data is authorized, the encryptor 250 encrypts data transmitted from the digital device prior to storage within the database 260. Further, as stored data is requested from the database 260, the encryptor 250 can decrypt the stored data prior to transmission of the stored data to the digital device. As a result, the stored data within the database 260 may always be encrypted.

The encryptor 250 can also decrypt the security code using the user code prior to authorization. When the security code is decrypted, the security code may be sent to the authorization module 220 where it may be compared to the one or more authentication passwords within the keystore module 210. In some embodiments, the database 260 and the keystore module 210 are retained on separate chips within the secure storage device 100.

The database 260 can comprise one more databases or other data structures of stored data. The database 260 may be contained within a storage system. The storage system is further discussed in FIG. 6.

The user interface module 270 controls the user interface (e.g., the radial dial input 120 in FIG. 1) and receives the user code. In exemplary embodiments, the user interface module 270 receives the user code from the user. In some embodiments, the user interface module 270 sends the user code to the encryptor 250 to decrypt the user code. In other embodiments, the user interface module 270 sends the user code to the encryptor 250 to decrypt a security code. The security code may be used to authorize access to the stored data.

The web page confidence module 280 is configured to receive a web page address from the digital device over the device controller 200 or a browser (e.g., a browser stored within the database 260. The web page confidence module 280 subsequently determine the trust level status of the web page associated with the web page address. The web page confidence module 280 may direct the display 130, a speaker, an LED, or any other device coupled to the secure storage device 100 to indicate the trust level status. A trust level status is a determination that the web page or the web site associated with the web page address is trustworthy (e.g., trusted or secure), untrustworthy (e.g., not trusted or not secure), or unknown (e.g., not determined or unable to be determined). In various embodiments, the trust level status of a web page or web site based on the web page address is determined before the web page is loaded or accessed by a browser.

In one example, when the secure storage device 100 is initially coupled to the digital device, the user is given the option to install a web trust client on the digital device. In some embodiments, the offer to install the web trust client may be displayed on the digital device or the display 130 on the secure storage device 100. The web trust client may forward web page addresses typed or visited by the user with a browser to the web page confidence module 280. Alternatively, the web trust client may set up a proxy in the browser. When the user visits a web page, the web page address is transmitted through the proxy and is also received by the web page confidence module 280.

In some embodiments, the database 260 contains a browser such as Firefox or Internet Explorer. The user may access the browser to browse web pages on the Internet. Web page addresses of web pages the user visits may be provided to the web page confidence module 280. In some embodiments, the user accesses the browser to securely surf the web. The browser may be limited to only visiting trusted web pages or only visiting those web pages not associated with a given black list. In various embodiments, the web page confidence module 280 may direct the proxy to bar access to web site addresses that are not secure (e.g., with an untrusted trust level status) or unknown trustworthiness (e.g., the trust level status is unknown or unable to be determined.)

The web page confidence module 280 may comprise or have access to a white list, black list, or third-party confidence database. In some embodiments, the white list, black list, or third-party confidence database is contained within the database 260 or the web page confidence module 280. In other embodiments, the web page confidence module 280 checks web page addresses against a white list, black list, or third-party confidence database on the digital device or over a network coupled to the digital device.

A white list is a list of web site addresses that are trustworthy. In some embodiments, the web page confidence module 280 builds the white list based on valid web page certificates and/or the user's designation that the web page or site is trusted. In some embodiments, all web pages accessed over a secure connection (e.g., https) is added to the white list. In other embodiments, producers of web pages or third-party businesses may generate a white list of secure web sites. The white list may be downloaded from the digital device and/or a network coupled to the digital device over predetermined periods in order to update the white list.

In various embodiments, the web page confidence module 280 authenticates the white list. In one example, the white list is decrypted by a public key within the secure storage device 100. As a result, the white list may not be available to the digital device in order to prevent tampering. The web page confidence module 280 may also check the integrity of the white list by comparing a signed hash of the white list to a hash of the white list that the web page confidence module 280 can create. If the hashes match, then the web page confidence module 280 may accept the white list.

A black list is a list of web site addresses that are untrustworthy. In some embodiments, the web page confidence module 280 builds the black list based on invalid web page certificates and/or the user's designation that the web page or site is untrusted. In some embodiments, all web pages that contain images of questionable value (e.g., pornography) or downloads of illegal software may be added to the black list by the web page confidence module 280. In other embodiments, producers of web pages or third-party businesses may generate a black list of unsecure web sites.

Many publicly available lists may be used as a black list. In one example, family software providers may provide a list of web pages and web sites that are unsafe for children. The web page confidence module 280 may download the list from the family software or add the list to the black list. In other embodiments, a business may provide a black list of sites not suitable for work. The black list may be downloaded and updated from the digital device and/or a network coupled to the digital device over predetermined periods.

A third-party confidence database is a database of identifiers (e.g., addresses) that are associated with web pages and web sites. The third-party confidence database may comprise identifiers of both safe and unsafe web pages and web sites. In some embodiments, the web page confidence module 280 transmits a query comprising the web page address to the third-party confidence database to determine if the web page address is associated with a web page that is safe (e.g., secure) or unsafe (e.g., unsecure.) In some examples, the third-party confidence database may be provided on a network by Ironkey or Verisign.

In various embodiments, the user may verify that the web page visited is valid based on the determination that the web page is secure. Many phishing scams include web pages that look like legitimate web pages (e.g., eBay or Wells Fargo) but are, in reality, attempting to trick the user into providing an account number or password. If the user accesses the correct web page address (i.e., not the phishing scam sites), then the web page confidence module 280 may recognize the web page address as secure. If the user is tricked or mistypes a web page address, the web page confidence module 280 may either not recognize the web page address or determine that the web page is not secure.

In some embodiments, the web page confidence module 280 receives a user trust setting. The user trust setting may be entered into the display 130 via the radial dial input 120 or an interface provided by the web trust client. In various embodiments, the web page confidence module 280 retrieves one or more user trust settings from the browser's security settings or third-party security software (e.g., Internet security software, firewalls, or spyware software.)

The user trust setting may provide instructions for trustworthiness and/or commands to download or access a white list, black list, or third-party confidence database. In one example, the user trust setting provides instructions that any web page address not associated with a black list, white list, or third-party database must be accessed over a secure connection or have a valid web page certificate before being identified as trustworthy. Alternatively, if the web page address does not have a valid web page certificate, the user trust settings may indicate that the web page associated with the web page address is not trustworthy or not secure. Those skilled in the art will appreciate that the user trust settings can be used in many ways to determine a trust status level.

The web page confidence module 280 may use the user trust settings to configure the web page confidence module 280 to download a white list or black list from one or more specific locations on a network at predetermined times. The user trust settings may also comprise a location of the third-party confidence database. In one example, the web page confidence module 280 queries the third-party confidence database identified within the user trust settings to determine the trust status level of a web page address.

Figure 3:
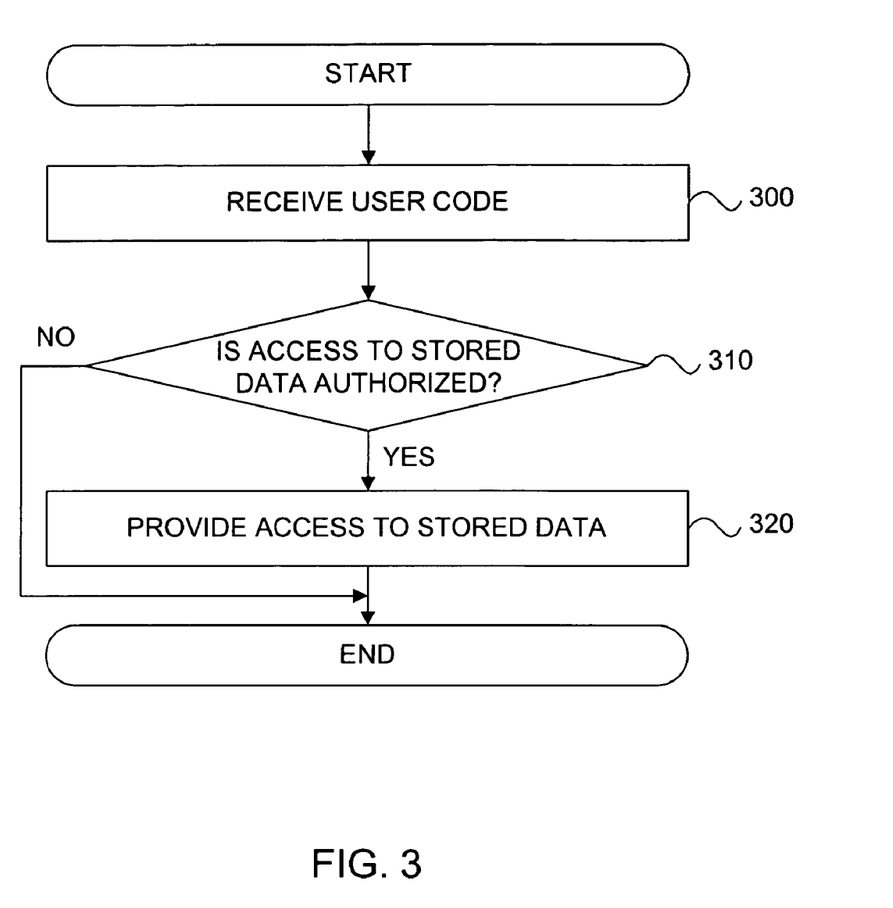
FIG. 3 is a flow chart for the entry of a user code to access stored data, in accordance with one embodiment of the present invention.

FIG. 3 is a flow chart for the entry of a user code to access stored data, in accordance with one embodiment of the present invention. The user interface module 270 (FIG. 2) receives the user code from the user in step 300. The user code may comprise a series of numbers, letters, symbols, or special characters. In other embodiments, the user code comprises a retinal scan, voice identifier, or fingerprint identifier.

In step 310, the authorization module 220 (FIG. 2) determines if access to the stored data is authorized. In one example, the authorization module 220 receives and compares the user code to the one or more authentication passwords within the keystore module 210 (FIG. 2) or the file system 230 (FIG. 2). If the authorization module 220 determines that access to the stored data is authorized, then the authorization module 220 may generate a signal to the device controller 200 (FIG. 2) to allow or provide access to the stored data in step 320. Once access to the stored data is authorized, a digital device (not depicted) may access the data stored within the database 260 of the secure storage device 100.

Figure 4:
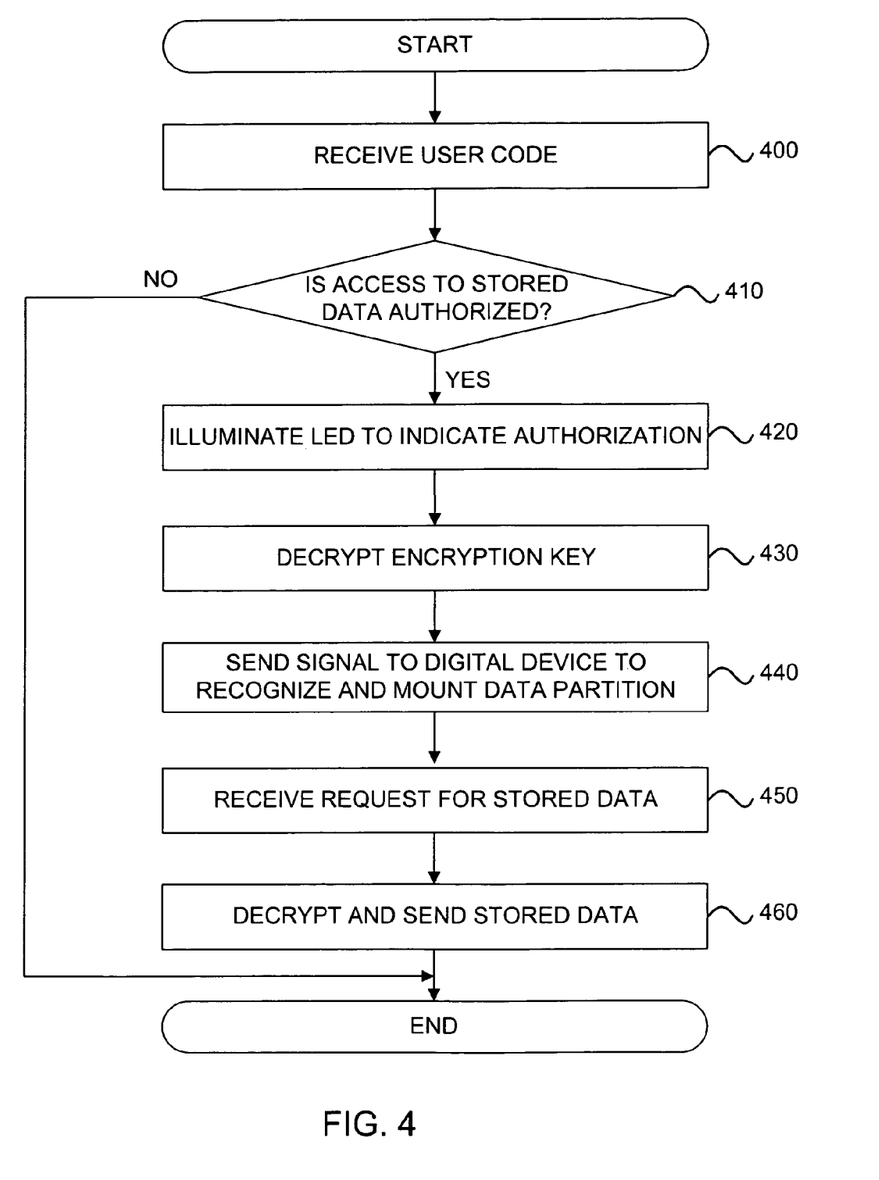
FIG. 4 is another flow chart for the entry of a user code to access stored data, in accordance with one embodiment of the present invention.

FIG. 4 is another flow chart for the entry of a user code to access stored data, in accordance with one embodiment of the present invention. In step 400, the user interface module 270 (FIG. 2) receives the user code from the user. In some embodiments, the user interface module 270 sends the user code to the encryptor 250 (FIG. 2) to decrypt the security code with the user code. The security code can then be transmitted to the authorization module 220 (FIG. 2) to determine if access to the stored data is authorized.

In step 410, the authorization module 220 determines if access to stored data is authorized. In one example, the authorization module 220 receives and processes the security code. The authorization module 220 can base the authorization determination, at least in part, upon the security code. In other embodiments, the authorization module 220 can base the authorization determination, at least in part, upon the security code and an authentication password. In an example, the authorization module 220 can retrieve the authentication password from the keystore module 210 (FIG. 2), the file system 230 (FIG. 2), or the database 260 (FIG. 2). In some embodiments, the authentication password is stored with one or more other authentication passwords. The authentication password may be stored in a hash table and/or encrypted. If the authorization module 220 determines that access to the stored data is authorized, then the device controller 200 (FIG. 2) can send a signal to illuminate the LED to indicate authorization in step 420. If access to the stored data is not authorized, FIG. 4 ends. Lockout and resetting the secure storage device 100 is further discussed in FIG. 5.

In step 430, in response to authorization to access the stored data, the encryptor 250 decrypts the encryption key. The encryption key can be used to encrypt data received from the digital device prior to storing within the database 260. Similarly, the encryption key can be used to decrypt stored data received from the database 260 to send to the digital device. The process of encryption/decryption can occur during saving and transmitting data with no appreciable loss of speed. In some embodiments, an encryption key and a separate decryption key are decrypted by the encryptor 250.

Upon authorization, the device controller 200 can descramble the database file system contained within the file system 230. As a result, the data partition containing the database 260 may be mounted once the secure storage device 100 is operationally coupled to the digital device.

In exemplary embodiments, after authorization is indicated, the secure storage device 100 (FIG. 2) can be operationally coupled with a digital device. In one example, the user inputs the correct user code and receives an indication that access to the stored data is authorized. The user can then couple the secure storage device 100 to the digital device, which subsequently sends an identification query to the secure storage device 100.

In step 440, optionally in response to an identification query from the digital device, the device controller 200 sends a signal to the digital device to identify the secure storage device 100 and mount the data partition. In step 450, the device controller 200 receives a request for stored data from the digital device. The requested stored data is unencrypted by the encryptor 250 with the proper encryption key prior to sending the requested stored data to the digital device in step 460.

In exemplary embodiments, the access to the stored data is authorized only for a predetermined period of time before re-authorization is required. In one example, access to the stored data within the secure storage device 100 remains authorized for two minutes unless the secure storage device 100 is operationally coupled to a digital device during that time.

In other embodiments, re-authorization is required after a predetermined period of inactivity. In one example, access to stored data is authorized and the secure storage device 100 is subsequently operationally coupled to a digital device via a USB connector. If data is not stored on the secure storage device 100 or retrieved from the secure storage device 100 within 30 minutes, then access to stored data may be denied until re-authorization.

In some embodiments, re-authorization is required after the secure storage device 100 is decoupled from the digital device or after the user presses a switch or button to terminate the session. In one example, the user unplugs the secure storage device 100 from a USB port on the digital device which terminates the session and access to the stored data requires re-authorization. It will be apparent to those skilled in the art that there may be many ways to terminate a session and require re-authorization.

In exemplary embodiments, the user can change or otherwise customize the user code. In one example, the user code comprises numbers, letters, symbols, or special characters. The user may enter a customize code to change the user code. In an example, the customize code can be sent from the manufacturer with the secure storage device 100. In another example, the user downloads the customize code from a website. The customize code may be unique to each secure storage device. Further, the customize code may change on every code change or after a predetermined time interval.

The user code can also comprise a fingerprint, voice identifier, or retina scan. In various embodiments, the customize code can be entered into the secure storage device 100 through buttons or switches. The fingerprint, voice identifier, or retina scan can then be entered. The entered fingerprint, voice identifier, or retina scan can then be used as the user code.

Figure 5:
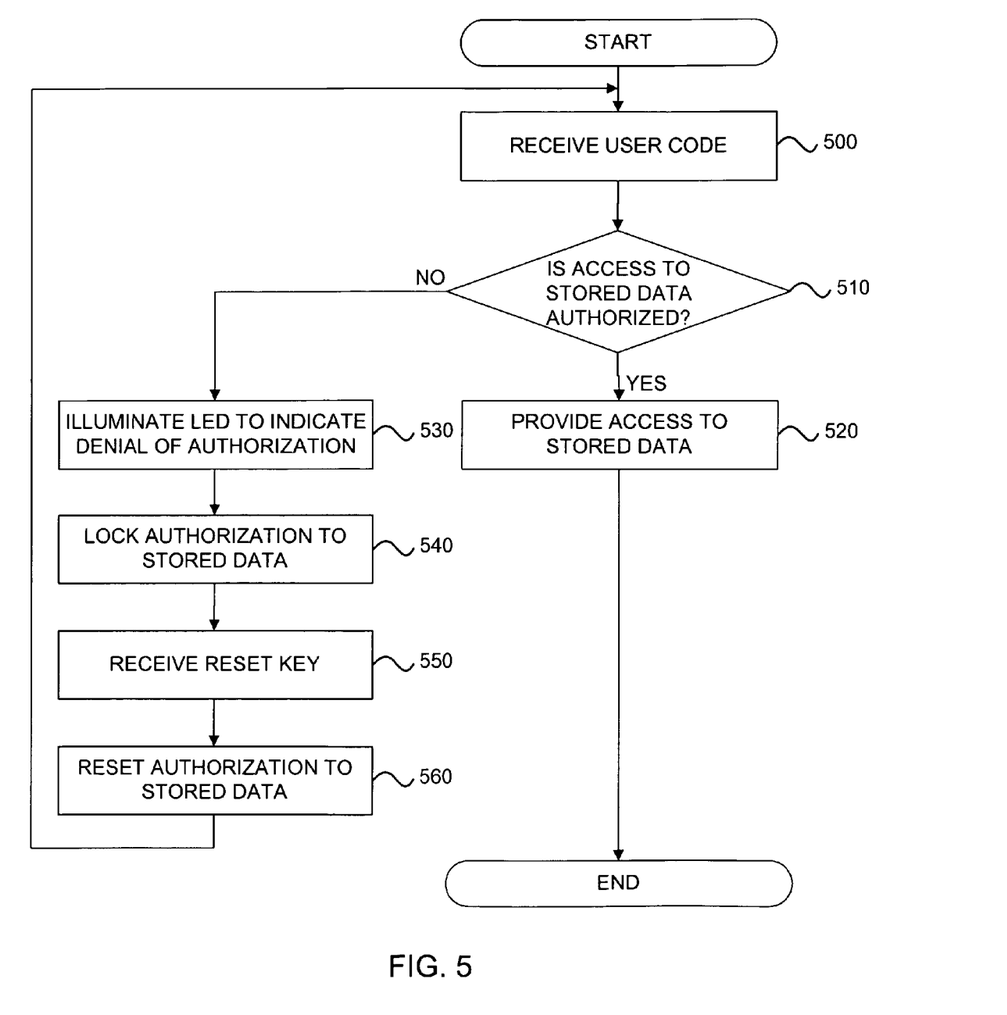
FIG. 5 is a flow chart for locking and resetting the secure storage device, in accordance with one embodiment of the present invention.

FIG. 5 is a flow chart for locking and resetting the secure storage device 100, in accordance with one embodiment of the present invention. In step 500, the device controller 200 (FIG. 2) receives the user code from the user to access to the stored data within the secured storage device 100 (FIG. 2).

In step 510, the authorization module 220 (FIG. 2) authenticates the user code to determine if access to the stored data is authorized. If access to the stored data is authorized, then the device controller 200 provides an operationally coupled digital device access to the stored data in step 520. If access to the stored data is not authorized and the user code is incorrect, the device controller 200 transmits a signal to illuminate an LED to indicate that denial of authorization in step 530. In one example, the LED is red which indicates the denial of authorization. In other embodiments, a sound is generated by the secure storage device 100 or light and one or more sounds are generated by the secure storage device 100 to indicate denial of authorization.

In step 540, the device controller 200 locks authorization to the stored data. This "lock out" requires that the secure storage device 100 be reset before access to the stored data is authorized. In some embodiments, a predetermined number of attempts to authorize access occur before the secure storage device 100 is locked out. The device controller 200 can transmit a signal to the authorization indicator (FIG. 1) to indicate that the secure storage device 100 is locked.

In exemplary embodiments, the user visits a product website, identifies the secure storage device 100, and requests a reset key. The reset key is a code that resets the secure storage device 100 so that the user can seek access to the stored data. In one example, the user creates an account on a website and must answer specific questions to authenticate the user's identity prior to requesting the reset key. The reset key can change over an interval of time, upon every use, or upon each request for the reset key. In other embodiments, the user receives the reset key upon purchase of the secure storage device 100.

In step 550, the device controller 200 receives the reset key from the user. The reset key can be used to decrypt a reset code prior to resetting the secure storage device 100. Further, the authorization module 220 may determine that the reset key and/or the reset code are authentic prior to resetting.

In step 560, the device controller 200 resets the secure storage device 100. In some embodiments, the device controller 200 transmits a signal to the authorization indicator to indicate that the secure storage device 100 is no longer locked. In some embodiments, the device controller 200 transmits an unlock signal to the authorization module to unlock the secure storage device 100 so that the secure storage device 100 can again receive a user code to access the stored data in step 500.

Figure 6:
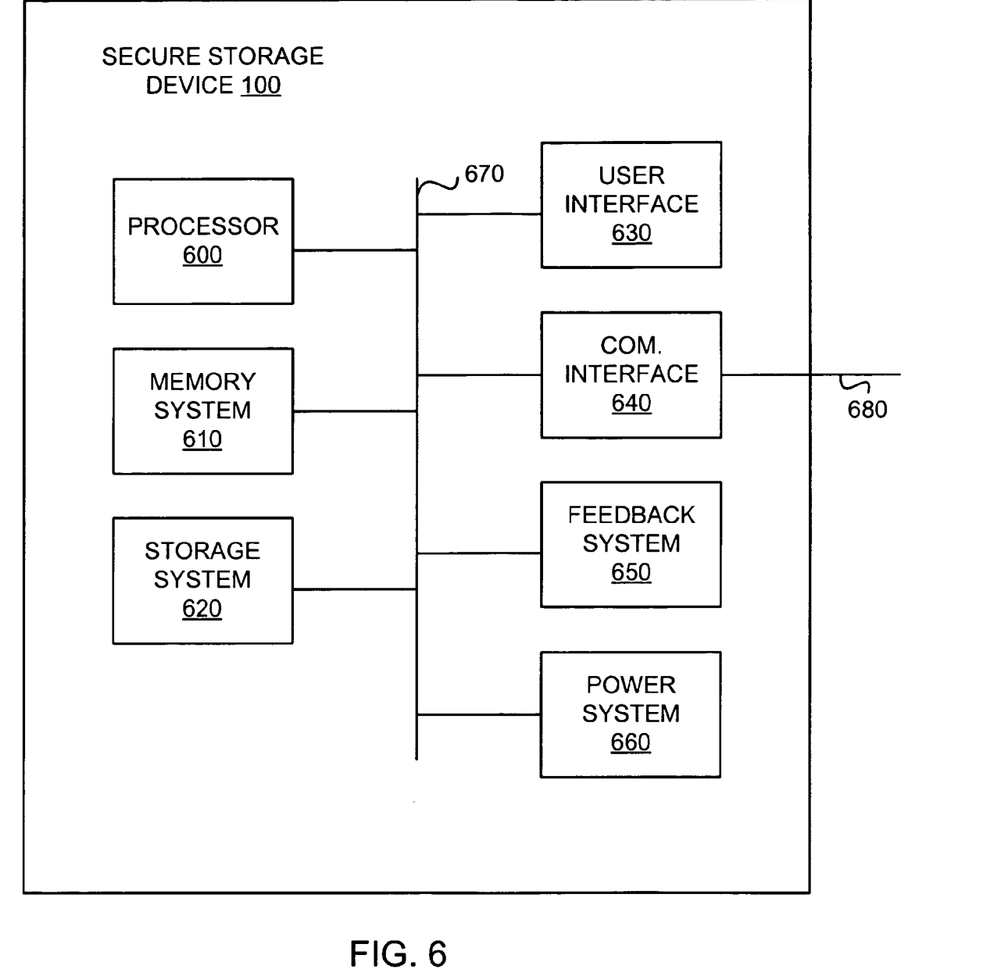
FIG. 6 depicts a secure storage device, in accordance with one embodiment of the present invention.

FIG. 6 is a block diagram of the secure storage device 100 in an exemplary implementation of the invention. The secure storage device 100 comprises a processor 600, an optional memory system 610, a storage system 620, a user interface 630, a communication interface 640, feedback system 650, and a power system 660 which are all coupled to a system bus 670. The processor 600 is configured to execute executable instructions. In some embodiments, the processor 600 comprises circuitry or any processor capable of processing the executable instructions.

The memory 610 is any memory configured to store data. Some examples of the memory 620 are storage devices, such as RAM or ROM.

The storage system 620 is any storage configured to retrieve and store data. Some examples of the storage system 620 are flash drives, hard drives, optical drives, and/or magnetic tape. The storage system 620 can comprise a database 260 (FIG. 2) or other data structure configured to hold and organize data. In some embodiments, the secure storage device 100 includes a memory system 620 in the form of RAM and a storage system 620 in the form of flash data.

The user interface 630 is any device that can receive a user code. The user interface 630 can be, but is not limited to, a radial dial, keypad, or biosensor.

The communication interface 640 can be coupled to any digital device via the link 680. As discussed in FIG. 1, the communication interface 640 may support communication over a USB connection, a firewire connection, an Ethernet connection, a serial connection, a parallel connection, or an ATA connection. The communication interface 640 may also support wireless communication (e.g., 802.11 a/b/g/n or wireless USB). It will be apparent to those skilled in the art that the communication interface 640 can support many wired and wireless standards.

The feedback system 650 is any indicator that signals the user that access to the stored data within the secure storage device 100 is authorized. In some examples, the feedback system 650 can be an LED light or sound. The feedback system 650 may also indicate that access to the stored data is not authorized or that the secure storage device 100 is locked.

The optional power system 660 is any system that can provide power to the secure storage device. The power system 660 can supply power to the secure storage device 100 to receive the user code and authorize access to the stored data. In one example, the power system 660 comprises a rechargeable battery, a replaceable battery, or a capacitor. The batteries or capacitor may be recharged with a power recharger or from power received from the digital device. In some embodiments, the power system 660 is optional, and the user code can be passively received. Once the secure storage device 100 is coupled to the digital device, power can be received from the digital device and the authorization process completed.

In some embodiments, the power system 660 supplies power to the processor 600 when the secure storage device 100 is not coupled to a digital device. In one example, the power system 660 supplies power to the processor 600 during the process of receiving the user code and authorization. Once the secure storage device 100 is coupled to the digital device, the digital device may supply power to the secure storage device.

Figure 7:
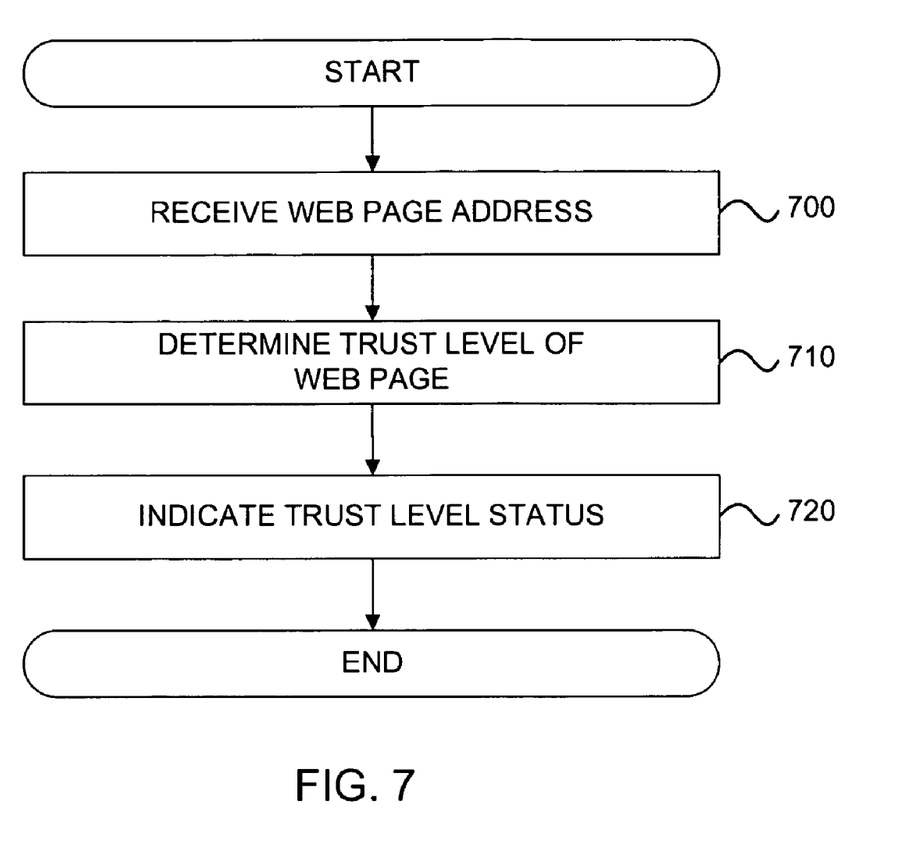
FIG. 7 is a flow chart for indicating a trust level status on a portable storage device, in accordance with one embodiments of the present invention.

FIG. 7 is a flow chart for indicating a trust level status on a portable storage device, in accordance with one embodiments of the present invention. In step 700 the web page confidence module 280 receives a web page address. In one example, the web page confidence module 280 receives the web page address from a browser on a digital device coupled to the secure storage device 100.

In step 710, the web page confidence module 280 determines a trust level status of the web page associated with the web page address. The web page confidence module 280 may check the web page address against a white list, black list, or third-party database to determine if the web page associated with the web page address is trustworthy, untrustworthy, or unknown. The web page confidence module 280 may also access user trust settings.

In one example, the user may select a "high", "medium", or "low" setting within the user trust settings for security. A "high" setting may indicate that web pages that do not meet a rigorous security standard (e.g., on a white list and comprising a valid web page certificate) are untrustworthy. A "medium" setting may result in more web pages being identified as "unknown" if the web page address is not on a white list or black list. A "low" setting may result in even more web pages being identified as "unknown". Those skilled in the art will appreciate that there may be many settings and that there may be many requirements (e.g., check against third-party confidence databases, secure channels, valid and unexpired certificates) that may or not be required based on the user security setting.

In step 720, the web page confidence module 280 transmits a command to the display 130, the authorization indicator, a speaker, LED, or any device associated with the secure storage device 100 to indicate the trust status level of a given web page or web page that is currently being visited by the user. In one example, the web page confidence module 280 transmits a command to the display 130 to display text, an image, or a color indicating that the web page is trustworthy, untrustworthy, or unknown.

Although three trust status levels are described (i.e., trustworthy, untrustworthy, and unknown), those skilled in the art will appreciate that there may be many trust status levels and a different indicator for each trust status level. In one example, trust status levels are not discrete values but are continuous. As a web page is increasingly trustworthy, the display 130 may display a greener color. Alternatively, if the web page is increasingly untrustworthy, the display 130 may display a redder color. In some embodiments, a slider is displayed on the display 130 that indicates the level of security associated with the web page.

Figure 8:
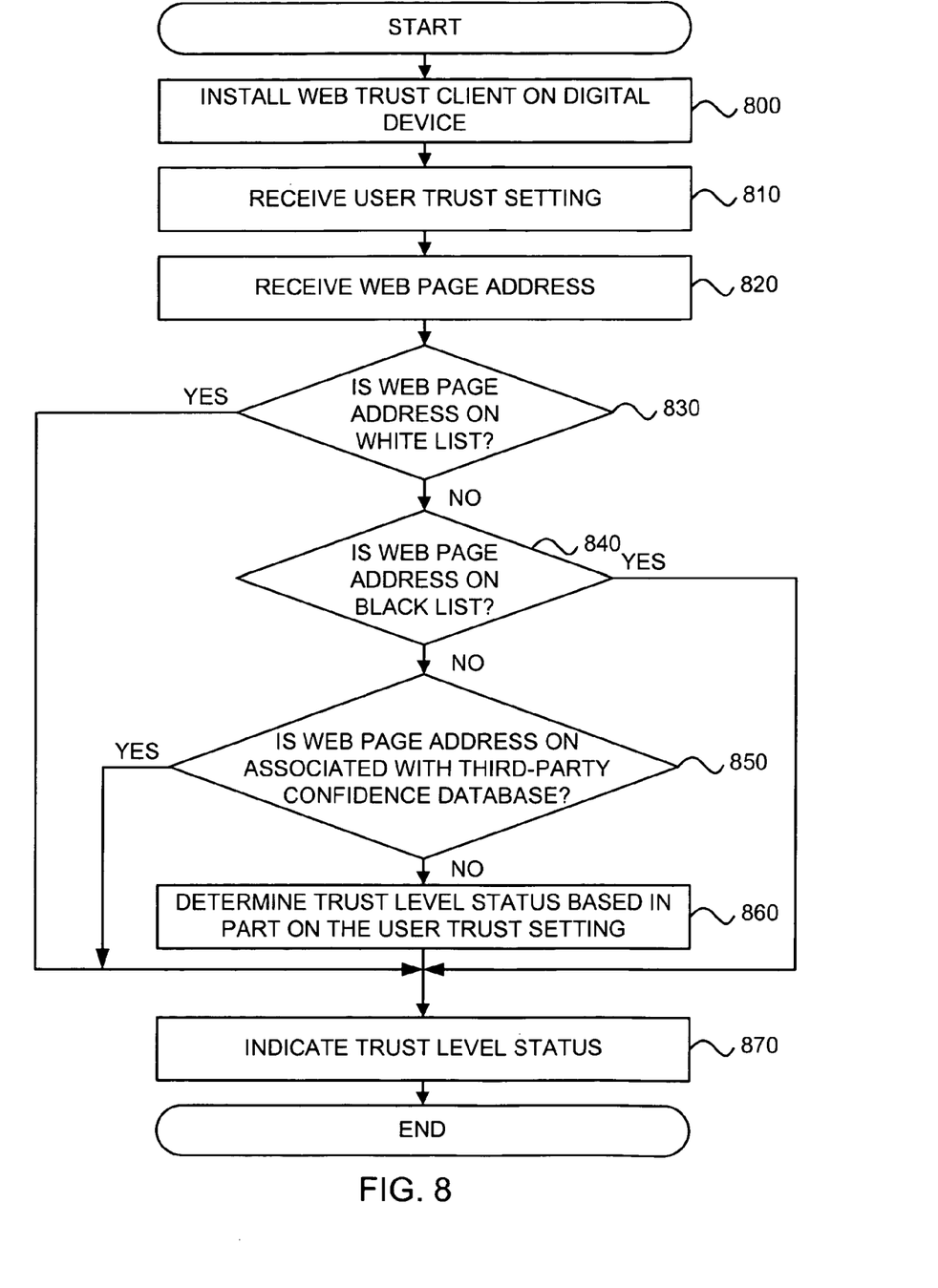
FIG. 8 is another flow chart for indicating a trust level status on a portable storage device, in accordance with one embodiments of the present invention.

FIG. 8 is another flow chart for indicating a trust level status on a portable storage device, in accordance with one embodiments of the present invention. In step 800, the web trust client is installed on the digital device. In one example, upon coupling the secure storage device 100 with the digital device for the first time, the user may be asked if they wish to install the web trust client or a proxy on the digital device. Upon the users assent, the web trust client or proxy is installed. In some embodiments, the program to install or uninstall the web trust client and/or the proxy may be executed at any time.

In step 810, the secure storage device 100 receives the user trust setting. Upon initially coupling the secure storage device 100 with the digital device, the user may be invited to input one or more user trust settings. The user may select or enter white lists, black lists, and/or third-party confidence databases. Further, the user may select a setting for the secure storage device (e.g., "high", "medium", or "low"). The user may also manually enter web site addresses that are to be trusted or untrusted.

The user may also select to enter a setting so to limit access to web pages or web sites. For example, the user may require that all web sites visited by the browser have a trusted trust status level. The browser may then be barred by the web page confidence module 280 to prevent a web page with an unknown or untrusted status level to be visited.

In step 820, the secure storage device 100 receives a web page address. In one example, the web trust client provides the web page address to the secure storage device 100. In another example, a proxy forwards the web page address to the secure storage device 100. In other embodiments, a browser within the database 260 may be configured to forward the web page address to the web page confidence module 280.

In step 830, the secure storage device 100 determines if the web page address is associated with a white list. The white list may be updated periodically or updated upon activation of the browser. The secure storage device 100 may also query a white list over a network coupled to the digital device to determine if the web page address is associated with the white list. If the web page address is associated with the white list, the secure storage device 100 may indicate trusted trust level status in step 870.

If the web page address is not associated with a white list, the secure storage device 100 determines if the web page is associated with a black list in step 840. Similar to the white list, the black list may be updated periodically or updated upon activation of the browser. The secure storage device 100 may also query a black list over a network coupled to the digital device to determine if the web page address is associated with the black list. If the web page address is associated with the black list, the secure storage device 100 may indicate untrusted or unsecure trust level status in step 870.

If the web page address is not associated with a white list or black list, the secure storage device 100 determines if the web page is associated with a third-party confidence database in step 840. The third-party confidence database may be downloaded and stored within the database 260 or the digital device. In other embodiments, the secure storage device 100 queries the third-party confidence database over a network coupled to the digital device to determine if the web page address is associated with the third-party confidence database. If the third-party database determines that the web site address is trusted or untrusted, the secure storage device 100 may indicate the trust level status in step 870.

In step 860, the secure storage device 100 determines the trust level status based, at least in part, on the user trust setting, if there is one. The secure storage device 100 may store the user trust setting within the database 260, the web page confidence module 280, or the digital device. The secure storage device 100 can also access the user trust setting within the browser or over a network coupled to the digital device (e.g., the user trust settings may be maintained on a web site accessible over a network or Internet). The trust level status may indicate the factors that must be satisfied to qualify as trusted or untrusted.

If no user trust setting is available, the secure storage device 100 may comprise a default trust level status policy whereby all web pages over secured connections or with valid certificates verified by a third-party trustee (e.g., Verisign) are trusted and all others are either unknown or untrusted. The default trust level status policy may also identify any web page address that is similar to but not a trusted web page address to be untrusted (e.g., misspellings of banking web site addresses).

In step 870, the secure storage device 100 indicates the trust level status. In various embodiments, a speaker, LED, or display 130 on the secure storage device 100 indicates the trust level status based on the trust level status determination. In one example, an LED may be continuously illuminated to indicate the trust level status (e.g., trusted.) In another example, the LED may blink to indicate an untrusted trust level status. Those skilled in the art will appreciate that there may be many ways to indicate trust level status.

In other embodiments, the secure storage device 100 commands a browser, API, or agent to indicate of the trust level status on a display of the digital device. In one example, traffic lights may appear within the browser with each color indicating the trust level status. There may be many ways to indicate a trust level status within a browser or display of the digital device.

Although many of the embodiments discussed herein discuss a secure storage device 100, the embodiments may be used with any portable and/or removable storage device, including, but not limited to portable flash storage device, a USB storage device, or portable hard drive. In one example, a USB storage device comprises a web page confidence module 280 configured to receive a web site address, determine the trust level status of a web page associated with the web site address, and direct a command to indicate the trust level status on the USB storage device (e.g., to a speaker within the USB storage device, LED, display, or any other indicator). Those skilled in the art will appreciate that any portable storage device may be used with embodiments of the claimed invention.

The above-described functions can be comprised of executable instructions that are stored on storage media. The executable instructions can be retrieved and executed by the processor 600. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The invention claimed is:

1. A portable storage device comprising:
   a processor; and
   a computer-readable medium storing computer instructions executable by the processor to implement a web page confidence module; and a device controller;
   wherein the web page confidence module is configured to receive a user trust settin of thigh medium or low, receive a web page address and determine a trust level associated with the web page address based at least in part on the user trust setting; and
   wherein the device controller is configured to indicate a trust level status on the portable storage device based on the trust level determination.

2. The device of claim 1, wherein the web confidence module is configured to check the web page address against a white list and a black list to determine if the web page address is trustworthy.

3. The device of claim 2, wherein the web confidence module is configured to check the web page address against the white list and the black list over a network.

4. The device of claim 2, further comprising a database containing the white list and the black list on the portable storage device, wherein the web confidence module is configured to update the white list and the black list over a network.

5. The device of claim 1, wherein the user trust setting indicates that web page addresses not meeting a standard of being on a white list and having a valid web page certificate are untrustworthy.

6. The device of claim 5, wherein the web confidence module is configured to identify the web page address as unknown if not on the white list or a black list.

7. The device of claim 1, wherein the web page confidence module transmits a command to indicate the trust level status by indicating that the web page address is trustworthy, untrustworthy, or unknown.

8. The device of claim 7, further comprising a display on the portable storage device for displaying a color to indicate whether the web page address is trustworthy, untrustworthy or unknown.

9. The device of claim 1, wherein the web page confidence module is configured to transmit a query comprising the web page address to a third-party database in order to determine if the web page address is associated with a web page that is secure or unsecure.

10. The device of claim 9, further comprising a display configured to display an image indicating that a secure web page is successfully accessed.

11. A method comprising:
receiving on a portable storage device a user trust setting of high, medium or low;
receiving, by the portable storage device, a web page address;
determining, by a processor on the portable storage device, a trust level of a web page associated with the web page address, wherein the trust level is based at least in part on the user trust setting and the web page address; and
indicating a trust level status for the web page on the portable storage device, based on the trust level.

12. The method of claim 11, further comprising operationally coupling the portable storage device to receive commands from a digital device connected to an internet.

13. The method of claim 12, wherein determining the trust level comprises transmitting the web page address to a third-party database over the internet.

14. The method of claim 11, wherein determining the trust level comprises checking the web page address against a white list and a black list contained within a database on the portable storage device.

15. The method of claim 11, wherein indicating the trust level status comprises illuminating an authorization indicator on the portable storage device based on a trustworthiness of a web page associated with the web page address.

16. The method of claim 11, wherein indicating the trust level status comprises emitting a sound from the portable storage device based on the trust level status.

17. A portable data storage device comprising:
a processor;
a display; and
memory for storing computer instructions executable by the processor to:
receive a user trust setting of high, medium or low for the portable data storage device;
receive an address of a web page accessible over an internet;
determine a trust level associated with the web page based on the address and the user trust setting; and
indicating a trust level status for the web page on the display, wherein the trust level status is based on the trust level associated with the web page.

18. The portable data storage device of claim 17, wherein the memory comprises NAND or NOR flash memory.

19. The portable data storage device of claim 17, wherein the user trust setting provides instructions that any web page address not associated with a black list, white list, or third-party database must be accessed over a secure connection before being identified as trustworthy.

20. The portable data storage device of claim 17, wherein trust level status identifies the web page address as unknown if not on the white list or the black list.

* * * * *

UNITED STATES PATENT AND TRADEMARK OFFICE
CERTIFICATE OF CORRECTION

| | |
|---|---|
| PATENT NO. | : 8,381,294 B2 |
| APPLICATION NO. | : 13/212151 |
| DATED | : February 19, 2013 |
| INVENTOR(S) | : David Alexander Jevans et al. |

Page 1 of 1

It is certified that error appears in the above-identified patent and that said Letters Patent is hereby corrected as shown below:

CLAIMS

| Column | Line | PTO | Should Read |
|---|---|---|---|
| 16 | 50 | "page confidence module; and a" | -- page confidence module and a -- |
| 16 | 52 | "receive a user trust settin of thigh medium" | -- receive a user trust setting of high, medium -- |

Signed and Sealed this
Seventh Day of May, 2013

Teresa Stanek Rea
*Acting Director of the United States Patent and Trademark Office*